United States Patent [19]

Summerville et al.

[11] Patent Number: 4,926,103

[45] Date of Patent: May 15, 1990

[54] SYSTEM FOR DYNAMICALLY DETERMINING POSITION OF MULTIPLE AUTOMATICALLY GUIDED VEHICLES

[75] Inventors: David F. Summerville, Garland; John P. Williston; Martin A. Wand, both of Plano; Thomas J. Doty, Dallas; Haradon J. Rice, Plano; Phen-Lan Huang, Richardson, all of Tex.

[73] Assignee: Texas Instruments Incorporated, Dallas, Tex.

[21] Appl. No.: 265,070

[22] Filed: Oct. 31, 1988

Related U.S. Application Data

[60] Continuation-in-part of Ser. No. 129,914, Dec. 4, 1987, Pat. No. 4,887,013, which is a division of Ser. No. 771,379, Aug. 30, 1985, abandoned.

[51] Int. Cl.$^5$ .......................... B62D 1/24; G05D 1/02
[52] U.S. Cl. ...................................... 318/587; 318/580
[58] Field of Search ..................... 318/580, 587; 901/1, 901/50; 364/424.01, 424.02, 443, 444, 447, 448, 450

[56] References Cited

U.S. PATENT DOCUMENTS

| | | | |
|---|---|---|---|
| 4,680,811 | 7/1987 | Harper et al. ........................ | 901/1 X |
| 4,807,127 | 2/1989 | Tenmoku et al. ............... | 364/424.01 |
| 4,821,192 | 4/1989 | Taivalkoski et al. ........... | 364/444 X |

FOREIGN PATENT DOCUMENTS

| | | | |
|---|---|---|---|
| 61-95414 | 5/1986 | Japan ..................................... | 318/587 |
| 62-42208 | 2/1987 | Japan ..................................... | 318/587 |
| 62-66114 | 3/1987 | Japan ..................................... | 364/443 |
| 62-138907 | 6/1987 | Japan ............................. | 364/424.02 |

Primary Examiner—Bentsu Ro
Attorney, Agent, or Firm—B. Peter Barndt; James T. Comfort; Melvin Sharp

[57] ABSTRACT

The invention is a method of dynamic collision avoidance for multiple automatically guided vehicles (AGVs) on bidirectional paths. It calculates windows, or areas of computer memory, against which it matches the reported positions of AGVs. The invention acts on information from a central data base in which the factory or operating space of the AGVs is mapped and from AGV position updates supplied by an independently operating visual navigation system. The invention dynamically calculates the locations and dimensions of the windows for each position update. Since these position updates occur in real time, many times each second, the invention provides the means for the AGV system's controller to prevent collisions between the AGVs and other objects without minimizing the degrees of freedom of AGV movement.

6 Claims, 2 Drawing Sheets

SYSTEM FOR DYNAMICALLY DETERMINING POSITION OF MULTIPLE AUTOMATICALLY GUIDED VEHICLES

This Patent Application is a continuation-in-part of U.S. patent application Ser. No. 07/129,914, filed on Dec. 4, 1987, now U.S. Pat. No. 4,887,013, which is a divisional of U.S. patent application Ser. No. 06/771,379, filed on Aug. 30, 1985, now abandoned, both are incorporated by reference hereby.

RELATED U.S. PATENT APPLICATIONS

This invention is related to the following U.S. patent applications, assigned to Texas Instruments Incorporated, and all filed on Aug. 30, 1985 which by reference are incorporated herein: Ser. Nos.: 771,397; 771,433; 772,061; 771,380; 771,432; 771,431; 772,280; 771,422; 771,443; 771,322; 771,379; 771,329; 771,459; and 771,545.

This invention is related to the following U.S. patent applications, assigned to Texas Instruments Incorporated, which by reference are incorporated herein, Ser. Nos.: 222,322 (filed on July 20, 1988); 195,345 (filed on May 12, 1988); 129,914 (filed on Dec. 4, 1987); 909,737 (filed on Sept. 19, 1986); and 191,834 (filed on May 9, 1988).

This invention is related to the following U.S. patent applications, assigned to Texas Instruments Incorporated, and all filed on Oct. 31, 1988, which by reference are incorporated herein: Texas Instruments Docket Nos.: TI-11104, TI-11110, TI-11112, TI-11113, and TI-12757.

BACKGROUND OF THE INVENTION

1. Field of the Invention

This invention relates to guidance and control methods for automatically guided vehicle (AGV) systems such as mobile robots and more specifically to methods for avoiding collisions between individual vehicles (robots) and other vehicles, or between vehicles and other moving or stationary objects.

2. Description of the Related Art

Conventional automatically guided vehicles such as those used to move materials in warehouses and factories provide minimal point- to-point movement control. Most such systems involve AGVs which follow a fixed guide track, usually either a radio transmitter antenna wire buried in the factory floor, a reflective stripe painted on the floor, or a reflective tape glued to the floor. Such methods are described in U.S. Pat. Nos. 45300056, 4554724, 4562653, 4593238, and 4593239. All of these schemes purposely limit the individual vehicle's fredom of movement by constraining the AGVs to follow a physically fixed path.

Most such systems rely on on-vehicle proximity detection, such as active bumpers or ultrasonic sensors, to deal with collisions with other AGVs, stationary objects, or personnel. In such systems, the AGVs also may move only one direction along the track.

Systems such as those described in the related Texas Instruments applications achieve true point-to-point movement by implementing control schemes which allow multiple AGVs to coexist inthe same pathways without collision or excessive queueing and by using free-roving AGVs having programmable bidirectional paths. These new methods maximize the degrees of freedom of AGV movement. The control scheme set forward in TI-11104, co-pending, implements a scheme of "static" collision avoidance for AGV systems. Essentially, that method uses a rule-based computer program to examine the "mapped environment" set forward in TI-10942, U.S. application Ser. No.: 771,397 and to report only those pathways determined "passable to AGVs" to a central data base, from which another scheduling program can draw the data necessary to move AGVs from one point to another in the system without attempting to place two AGVs in the same place simultaneously.

Important disadvantages in the prior art, then are: it is either limited to close pathways, unidirectional motion, lack of external control of AGV motion, or limited to "static" collision avoidance (i.e., path planning as opposed to path supervision).

SUMMARY OF THE INVENTION

The invention described herein provides an additional measure of control to free-roving AGV systems by implementing "dynamic" collision avoidance methods. That is, this invention gives AGV control systems the ability to control autonomous AGVs in real time (as they move).

The invention operates in addition to the control scheme set forward in Texas Instruments application 10942 (U.S. serial number 771,397), where an external system executive coordinates the tasks of multiple, independently running, computerized control programs which include a communications controller, a central data base, on-board vehicle controllers, a vehicle routing and scheduling controller, and a visual navigation system to provide factory-floor position information updates to free-roving mobile robot AGVs which incorporate onboard dead reckoning. In the TI systems, the AGVs travel within programmable pathways. The AGVs are omnidirectional and can rotate in place; that is, they have a zero turning radius and can move with equal control in any direction. This scheme allows the AGVs to operate in a minimum of pathway space but simultaneously to service a factory layout with maximum efficiency. Furthermore, since the path is not physically attached to the floor, and since the external control scheme can identify the individual AGVs separately, the AGVs can pass each other in any direction, with or without stopping.

The improvements offered by the TI systems create the additional control problem of requiring some means to monitor the AGVs in a continuously changing environment (to the control system, the AGV and its immediate surroundings appear to change as the AGV moves in relation to the factory). The invention provides these means by implementing a "search window" in the control computer's memory.

TERMS USED IN DESCRIBING THE INVENTION

The invention works as part of an overall control scheme which defines the allowable travel path for an AGV as a series of path segments through or between possible destination points (called nodes) which are defined for the factory floor. AGVs can move to or through any of these nodes and can arrive in a predetermined order, according to "rules" of travel applied by a routing program (set forward in TI #11104, co-pending).

The following descriptions of the invention incorporate several key terms including: factory map, nodes, path, path segments, memory, window, and AGV.

The physical operating environment of the invention is assumed to be a factory. An AGV is an automatically guided vehicle. When the AGV control system is installed in the factory, the system operators select an arbitrary physical marker as the "factory origin." Using measuring tapes or surveyor's equipment, the location of each machine, each node, and each external visual navigation system television camera is determined and then entered into the external system computer data base as a "factory map." The factory map and its information about the location of the nodes is stored in a central computer data base accessible to each of the independently operating control programs, of which the invention is one. A node is a specific location (in factory-floor coordinates) in the factory. Factory-floor coordinates are positions in Cartesian coordinates, using the factory origin as the point (0,0).

A node is defined for each machine to be serviced, for each place in the factory where an AGV may need to be parked (servicing areas, battery-charging stations, and the like), and for any point in the factory where AGVs routinely may be required to turn or rotate. When a node is defined, it also is identified with the external visual navigation system camera which can "see" it.

Path segments connect each pair of nodes. For example, a path segment consists of a starting node, an ending node, and all the "empty" (i.e., nonassigned) space in between. Rather than directing an AGV to travel from one node to another, the external system controller "reserves" for the AGV the path segments which connect the two nodes. It does this by using rule-assembling routines to transform the node list from a central, shared data base into a group of rule-defined path segments, then storing those segments in an area of the data base called the final path table.

Physical control is afforded by a combination of:
an independently operating visual navigation system which periodically reports the locations of the AGVs as they move among the nodes, and
multiple (one for each AGV) independently operating on-board control programs which incorporate dead-reckoning software.

The position updates are recorded in an area of the control computer's memory and also are sent to the appropriate AGV's onboard controller memory. The absolute position data for the dead-reckoning software is generated by the steering and drive mechanisms in the AGVs and is compared to the AGV positions reported by the visual navigation system.

The effectiveness of this integrated scheme is based on the system's ability to "model" the factory environment and AGV population in computer memory. This technique allows the AGV controllers and the central control system to determine at any specific time the location of each AGV. This provides static collision avoidance. That is, the programs can prevent collisions by directing the AGVs only to known "safe" positions, the nodes which have been determined by the system's rules to be free of obstacles or other AGVs. A means of providing such static control is detailed in TI#11104, co-pending.

The invention provides "dynamic" control in such a system by implementing in the control computer's memory a "window" for each AGV. Since the control computer has access to an AGV's most recent position update, the program embodied in the invention can calculate the logical equivalent of a window in the computer's memory, through which it can "watch" a particular AGV. The window is an area of memory slightly larger than the AGA itself and centered on the AGV. The size of the window is calculated so as to exclude other AGVs or stationary portions of the factory. This window in a sense "overlays" the computer's memory model of the factory map. Thus, the invention provides the means for the control computer to check the contents of this area of memory (the window). Then, if the check reveals the AGV of interest, the control computer can assume the AGV is "on course" and out of danger. There is no danger of colliding with another AGV because the method used to define the length of the window requires that two nodes be defined for the AGV and, according to the rules of travel set forward in the static control scheme identified in TI#11104 (co-pending), no two AGVs can share a node. Furthermore, the factory map is defined such that paths may only cross at a node; that is, every valid intersection in the system occurs at a node.

Both dynamic and static control are necessary because the various control programs in the stationary and mobile controllers can be considered "intelligent." In this case, "intelligent" means that the control programs are capable of simultaneous and independent operation. The operating system for the system executive is a real-time, multitasking program. These characteristics allow the various parts of the control system to act independently. The central data base concept adds the capability for the independent tasks to access information from other tasks. The effect is to maximize both control (through the hierarchy) and autonomy. Therefore, each independent task must be capable of controlling itself and of interacting with the distributed control system autonomously.

DESCRIPTION OF THE PREFERRED EMBODIMENT

In the TI systems, an AGV can move from one point to any other point in more than one way. As many as five or six AGVs may be operating independently and simultaneously in the same area. Furthermore, although specific paths are defined (and reserved) for the AGVs, the AGVs may at times wander off-path and collide with obstructions. These characteristics make it imperative to have some means of continuously monitoring AGV location.

When the AGVs move along a path, a certain amount of deviation from the path can be expected and tolerated. The invention allows for this by implementing a "window" about the current path of an AGV and by changing the size and shape of this window to match changes in the path.

CALCULATING THE WINDOW DIMENSIONS

The window must be large enough to include the AGV, but not so large as to include other AGVs or stationary objects. The window should coincide with the desired path of the AGV, enclosing all points through which the AGV will move, including a small "tolerance" distance to allow for variations in AGV movement (such as occur when the AGV rolls over uneven surfaces).

Figure 1:
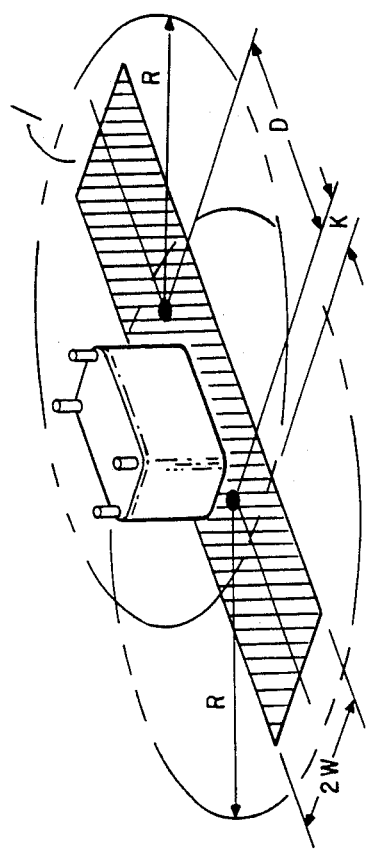
FIG. 1 is a drawing showing the data used to calculate the dimensions of a window for an AGV moving between two nodes.

The illustration in FIG. 1 shows an AGV in motion along a path between two nodes. Line 1 represents the straight-line distance between the nodes and, thus, the axis of the path. Distance w, taken to be perpendicular to the axis of the path, is half with width of the window. This distance w is a constant for any two adjacent nodes, hence for any path segment, but w can be different for one path segment to the next. For example, two nodes at a machine which requires accurate material handling from the AGV may in fact allow only very small values for w; whereas two nodes which are not ever used for AGV parking may allow for relatively larger values of w. Therefore, distance w allows for slight, but noticeable, variations in AGV motion. Distance r is the radius of each of two circles (each of which is centered on a node). The radius is the sum of the distance between the two nodes centers and a small tolerance k distance (again, to accommodate small variations in AGV motion). The shaded area represents the window as defined by the intersections of the two circles and the lines formed by the offsets (w) to the axis of the path.

The equation used to define the length of the window depends on the distance between the two nodes:

$$\text{Radius} = r = \sqrt{(Vx^2 + Vy^2)} + k$$

where:
Vx = distance between end points along the x axis,
Vy = distance between end points along the y axis,
k = a constant (somewhat arbitrary tolerance).

The equation used to calculate the AGV's offset from the axis of the path is:

$$L = \frac{-Vy(Rx - Px) + Vx(Ry - Py)}{\sqrt{(-Vy^2 + Vx^2)}}$$

where:
Rx = x coordinate of the AGV,
Ry = y coordinate of the AGV,
Px = x coordinate of an end point,
Py = y coordinate of an end point,
Vx = distance between end points along the x axis,
Vy = distance between end points along the y axis.

The distance L is the current (variable with each position update) offset of the AGV from the centerline of the path. Therefore, L must always be less than w. This allows a check for L > w to provide a means to control (stop) the motion of the AGV as required.

These computations must be made in real time. In the preferred environment as described in TI application 10942 (U.S. serial number 771,397), an independent software task monitors the motions of each AGV in the system and determines where (in factor coordinates) each AGV is located. That task is a visual navigation system whose uses downward-aimed television cameras to monitor beacons on the AGVs, an image-processing system to extract factory coodinates from the images of the beacons, and a communications subsystem to transmit periodic position updates to the system controller and to the AGV's themselves. The invention described herein implements in another computer's memory a window which is expected to contain a particular AGV. When the position updates for that AGA place the AGV within the window, the invention takes no action. But when the position updates indicate the AGV is outside the window, the invention signals a potential collision condition to the system controller, which may elect to stop that AGV or all AGVs, depending upon information in the central data base.

PROGRAM OVERVIEW

The invention is one of a number of independent tasks which operate under the direction of a supervisory system controller. Some of these tasks operate on demand, such as when the system controller requests that an AGV move from one location in the factory to another. Some tasks, like the invention, operate continuously. The invention runs all the time, looping back on itself to pick up new data at each position update from the visual navigation system.

Figure 2:
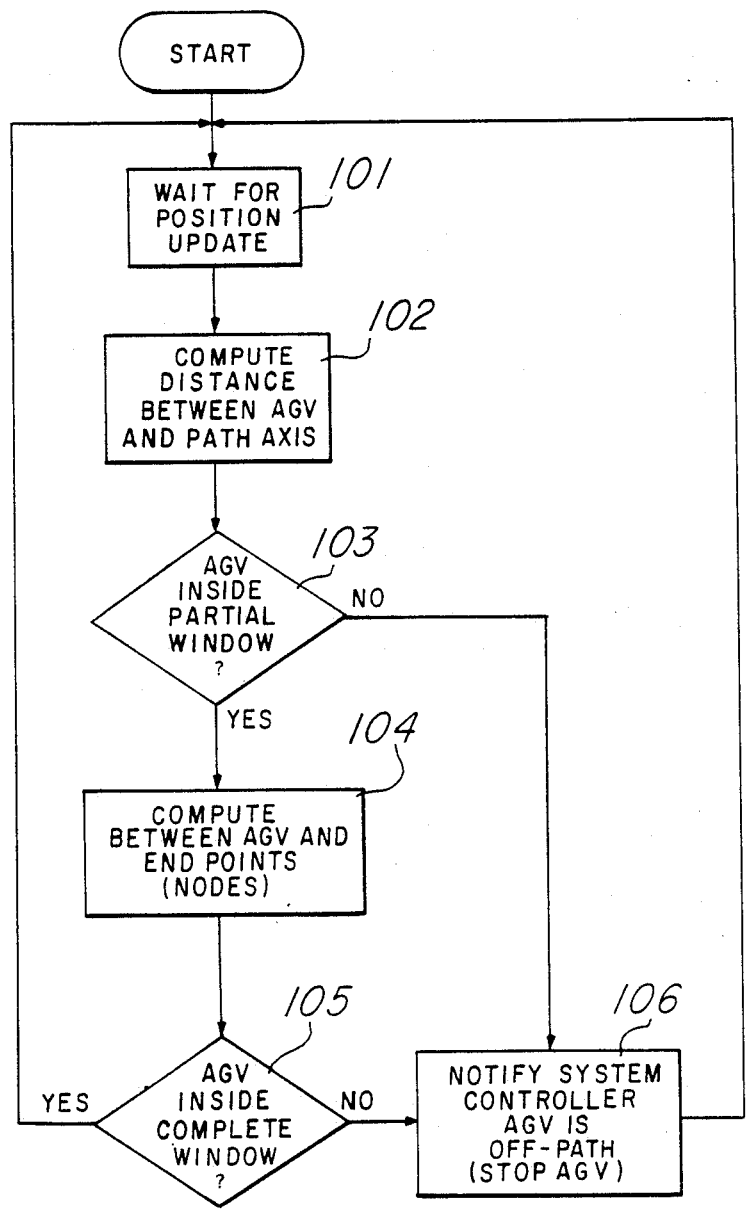
FIG. 2 is a flowchart illustrating the method used to create the window and to check the AGV's position relative to the window.

The remainder of this discussion refers to the flowchart, FIG. 2. At the start, the program picks up the most recent visual navigation system position update (step 101). At step 102, the program calculates the distance between the robot and the line between the end points of the current path segment. The end points coincide with the nodes between which the AGV moves. The information used in this calculation is encoded in the visual navigation position update and, in the case of the end points, from the central data base. The distance defines how far (laterally) the AGV has moved from the planned trajectory (the straight line through the end points).

Since the width of the window is known (the maximum allowable distance w either side of the path axis is a constant), the program now has enough information to answer the question at step 103. If the AGV has moved too far laterally, it will not be within the window and must be stopped, as at step 106. Once the program sends a "stop AGV" message, it loops back to the start and awaits another position update.

It is important to note at this point that the invention determines that an AGV is not within the expected area (window). It reports this fact to the system controller via a communications task. In most cases, the system controller will send a "stop AGV" message to all the AGVs to prevent a possible collision.

If the AGV's position puts it within the lateral dimensions of the window, the answer at step 103 is Yes and the program must compute the distance between the AGV and the end points of the window (step 104). As before, the information for this calculation is encoded in the position update and in the factory map. The result of the calculation is to "close the window" by defining how far along the path (in each direction) the window extends. This has the effect of limiting the search area for the AGV. At step 105, the program again searches for the AGV. Once again, if the AGV has moved too far, it will not be within the window and must be stopped, as at step 106. If the program determines that the AGV's position is within the window's boundaries, the program takes no action with respect to the AGV and simply loops back to the start to await the next position update.

As is clear in FIG. 2, once started, the invention runs continuously. It will send a "stop AGV" message whenever it determines an AGV's location lies outside a window's boundaries. It will simply loop back on itself whenever its two searches yield an AGV within a window. And it dynamically calculates the location and dimensions of the windows in which it searches for AGVs.

What is claimed:

1. A system for monitoring the expected position of an AGV moving along a path between nodes, the path having path segments between adjacent nodes, comprising:
- a computer having a memory, the memory containing a representation of the path and the last known position of the AGV;
- a window defined in the memory overlying the representation of the path segment for encompassing the expected position of said AGV;
- means for adjusting the size of the window based upon deviations of the AGV from the path;
- navigation means for location said AGV;
- means for updating the last known position of the AGV in the memory based on the location of the AGV determined by the navigation means; and
- means for determining whether the last known position of the AGV is located within said window.

2. The system of claim 1, further comprising:
- means for stopping said AGV in response to a determination by said determining means that the last known position of said AGV in the memory is not located within said window.

3. The system of claim 1, wherein said window has a length sufficiently long to encompass the representation of the path between two adjacent nodes.

4. The system of claim 1, wherein said window is sufficiently wide to encompass the last known position of said AGV when said AGV makes minor deviations from its path along a line connecting two adjacent nodes.

5. The system of claim 3, wherein said length equals the distance between the representation of said two adjacent nodes, plus a constant tolerance.

6. The system of claim 4, further comprising:
- a window overlying the representation of each of said path segments;
- wherein each window has constant width which may differ from the constant width of the other windows.

* * * * *